April 13, 1954  C. W. BERTHIEZ  2,674,925
BORING AND MILLING MACHINE AND THE LIKE MACHINE TOOL
Filed May 27, 1947  6 Sheets-Sheet 1

Charles William Berthiez
INVENTOR
By George H. Corey
His Attorney

April 13, 1954 C. W. BERTHIEZ 2,674,925
BORING AND MILLING MACHINE AND THE LIKE MACHINE TOOL
Filed May 27, 1947 6 Sheets-Sheet 2

Charles William Berthiez
INVENTOR
By George H. Corey
His Attorney

April 13, 1954

C. W. BERTHIEZ 2,674,925

BORING AND MILLING MACHINE AND THE LIKE MACHINE TOOL

Filed May 27, 1947

Charles William Berthiez
INVENTOR

By George N. Carey

His Attorney

April 13, 1954     C. W. BERTHIEZ     2,674,925
BORING AND MILLING MACHINE AND THE LIKE MACHINE TOOL
Filed May 27, 1947     6 Sheets-Sheet 6

Charles William Berthiez
INVENTOR
By George H. Corey
His Attorney

Patented Apr. 13, 1954

2,674,925

UNITED STATES PATENT OFFICE 2,674,925

BORING AND MILLING MACHINE AND THE LIKE MACHINE TOOL

Charles William Berthiez, Paris, France

Application May 27, 1947, Serial No. 750,773

Claims priority, application France June 4, 1946

3 Claims. (Cl. 90—14)

This invention relates to machine-tools, more especially of the type comprising a tool-spindle horizontally supported by a head-stock for axial displacement. This machine type is represented in the first place by combined boring and milling machines designed to operate on workpieces of widely different and large dimensions.

In these machines, boring and milling operations frequently alternate with each other when machining a workpiece. While it is possible to simply insert in a machine spindle a milling cutter instead of a drill or boring tool, this can be done only with small sized milling machines, but not with machines used in machining large workpieces because of the unavoidable great overhang of the tool-spindle which is required to enable the milling-cutter to reach all parts of a large surface area. In these cases, the workpiece as a rule has to be moved from one machine to another, which in view of the loss of time encountered in moving and remounting heavy workpieces, is highly undesirable.

It is an object of my invention to provide means whereby this drawback is obviated.

It is a further object of this invention to provide a machine adapted for the alternating carrying out of boring and cutting or milling operations without the necessity of moving the workpiece on the machine or from one machine to another.

It is still another object of the invention to provide mechanism, in a machine of the type here in view, for changing over from one operation to another of a different kind or requiring a greater or lesser reach of the tools without requiring the actuating of different control organs.

I have succeeded in eliminating most of the difficulties hitherto encountered in this kind of work by forming, in machines comprising a headstock and a spindle supported therein, that side of the headstock which faces the work, with a large machined and trued surface adapted for the securely and accurately holding tool fittings mounted thereon, and mounting the headstock on a carriage allowing it to be moved bodily towards the workpiece. In this way, the reach of the tools is increased beyond that of a movable headstock and spindle, since tool fittings designed for large overhang can now be moved across the table to reach all points of a large area to be machined.

In the drawings affixed to this specification and forming part thereof some embodiments of this invention are illustrated diagrammatically, by way of example.

Figure 7:
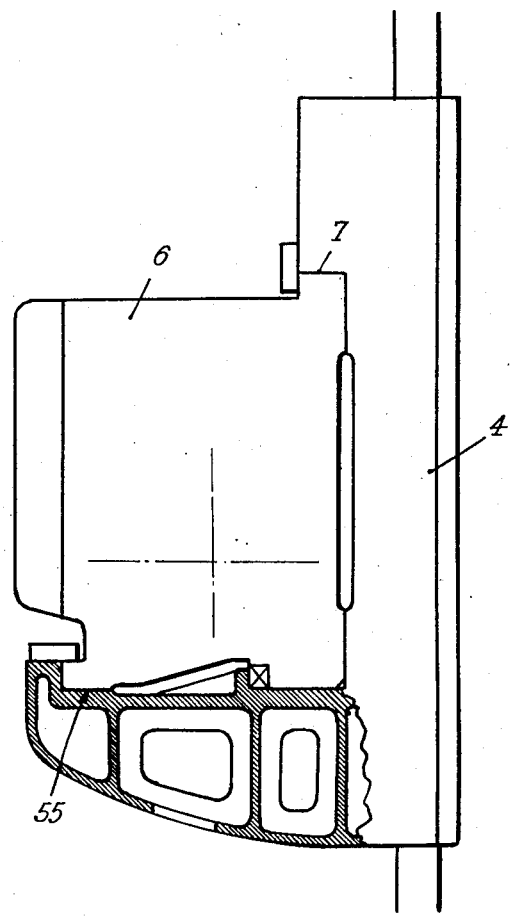

Lastly Fig. 7 is an elevational side view partly sectional of a modified form of the shoe or carriage supporting the spindle carrying headstock.

Figure 1:
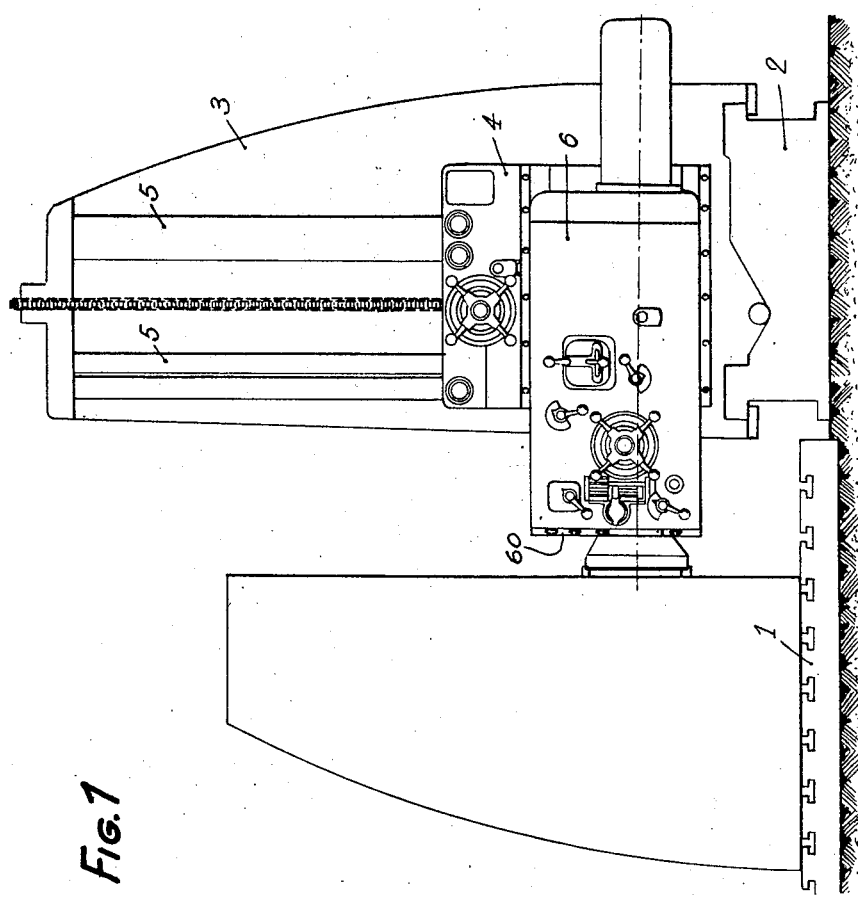
Fig. 1 is an elevational front view of a complete boring and milling machine according to my invention.
Figure 1:
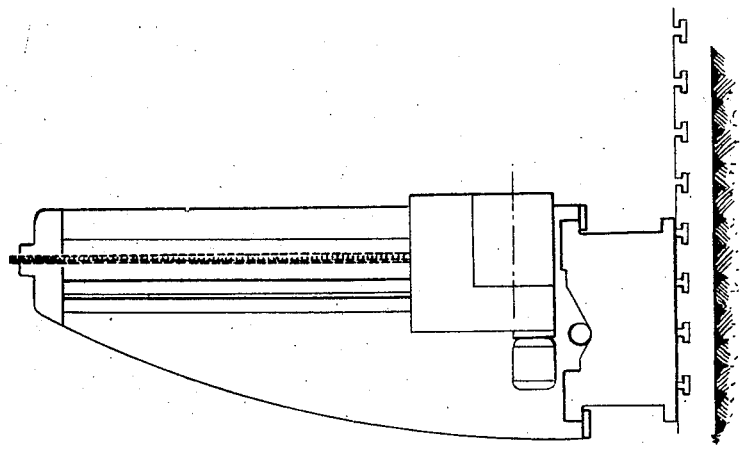
Figure 2:
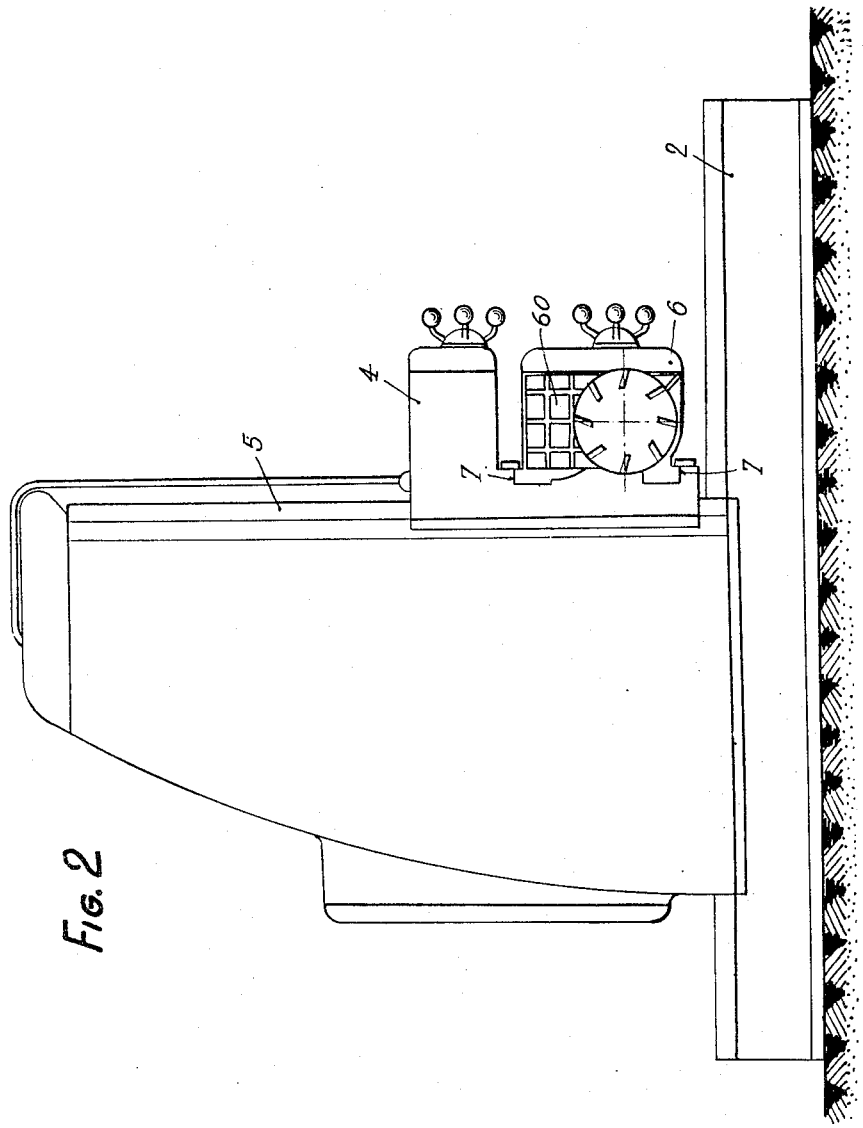
Fig. 2 is an elevational view of one of the uprights of the boring and milling machine illustrated in Fig. 1, said view being taken from the side of the machined surface of the spindle carrying headstock.

Returning to Figs. 1 and 2, the boring and milling machine illustrated by way of example includes a floor plate 1 adapted to receive the workpiece. A bed 2 is arranged along one side of the floor plate 1 and carries an upright 3 adapted to slide on it. On the upright 3 may slide a saddle 4, said saddle or carriage being guided by the vertical guideways 5; said saddle 4 carries in its turn a headstock 6 adapted to slide horizontally on the saddle along slideways 7 as shown more clearly in Figs. 2 and 3.

Inside the headstock 6 is provided a sleeve 8 (Fig. 4) adapted to rotate in bearings 9 and 10 which are (Fig. 4) provided with conical rollers, and which prevent any longitudinal movement of the sleeve within the headstock. On the sleeve is keyed a gear 11 serving for rotating it. The necessary power is provided by a motor 39 and gear box 40. Inside the sleeve is splined the spindle 12 of the machine, that rotates with the sleeve, by reason of the presence of keys 13 secured rigidly to the sleeve, and adapted to slide in cooperating grooves 14 provided on the outer surface of the spindle.

Figure 4:
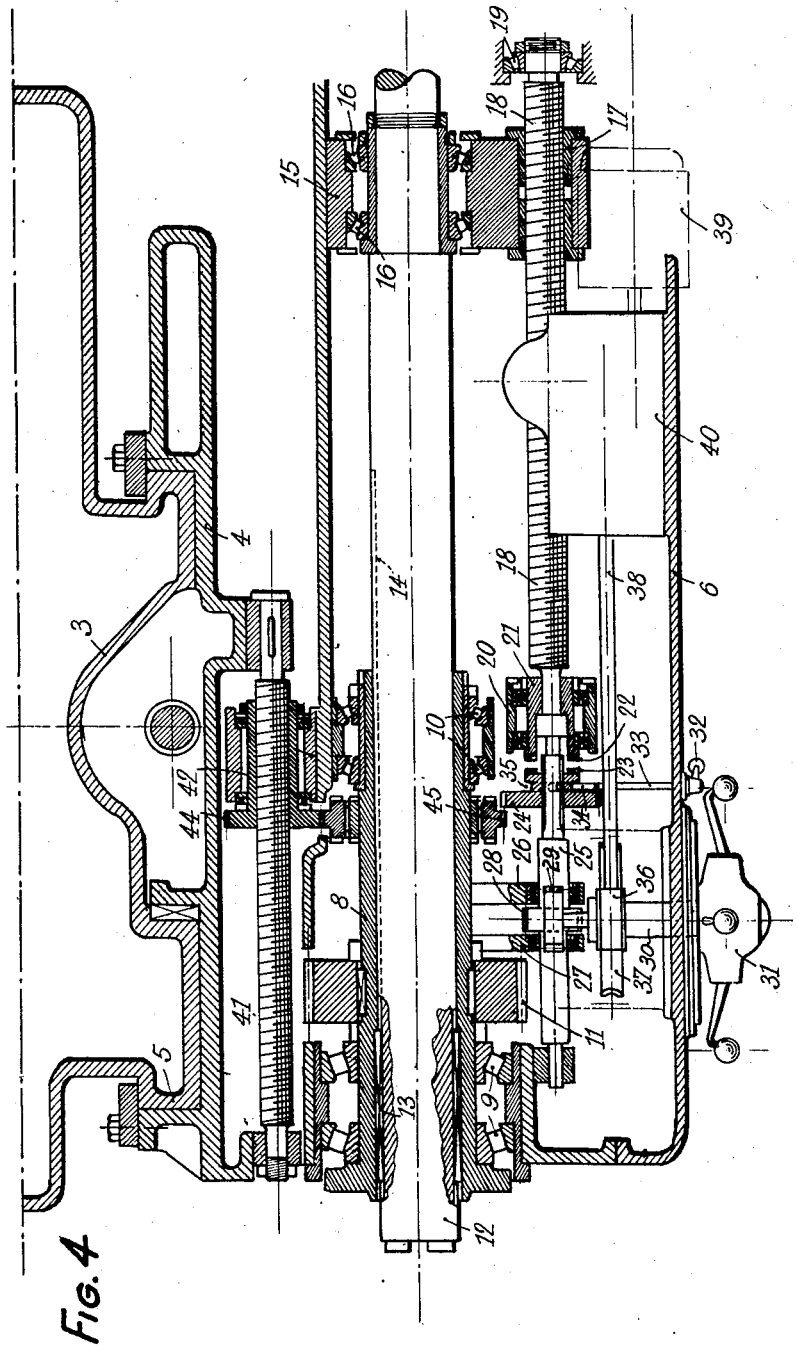
Fig. 4 is a longitudinal cross-section thereof.

The projection and retraction of the spindle are obtained through a contrivance illustrated diagrammatically in Fig. 4 and comprising a collar 15, held against axial displacement relative to the spindle by means of two roller bearings 16; said collar is fixed to a nut 17 adapted to move longitudinally over a screw spindle 18 which latter is held against axial displacement by two bearings 19 and 20 mounted in the body of the headstock. The left-hand end of the screw spindle 18 is connected by means of splines inside a sleeve 21 provided with claws 22 adapted to cooperate with similar claws 23 formed on a gear-wheel 24 to be described hereinafter. This gear-wheel 24 is splined on a shaft 25 supported by two ball bearings 26 and 27 carried by the headstock.

To the shaft 25 is keyed a helical gear 28 meshing with another helical gear 29 (see also Fig. 3) carried by a shaft 30. The shaft 30 may be operated from the outside of the headstock through the agency of a turnstile 31 connectible to the shaft 30 as hereinafter described. A lever 32 keyed to a rod 33 provided with a fork 34 which engages a groove 35 in the gear-wheel 24 allows displacing the latter along the shaft 25 so as to provide for the engagement or disengagement of the cooperating claws 22 and 23. The above-mentioned members form the spindle feed control means to be operated directly through the turnstile 31.

Figure 3:
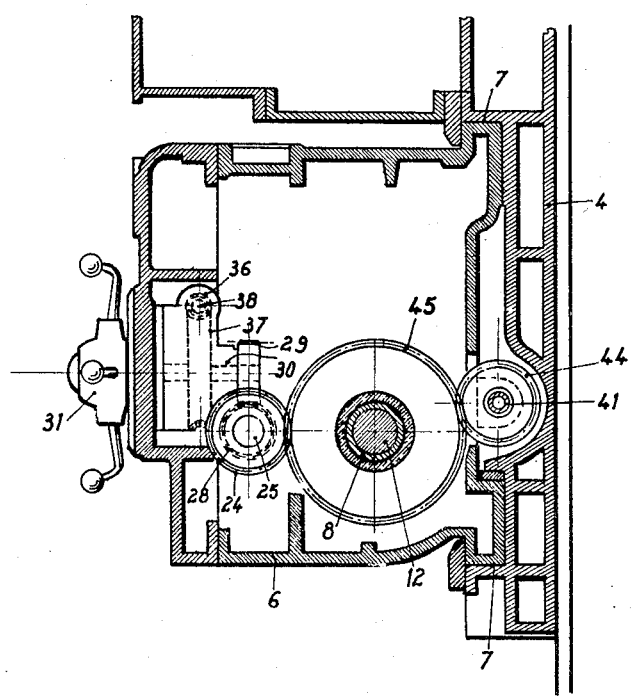
Fig. 3 is a transverse cross-section on a larger scale of the spindle carrying headstock and of the carriage supporting the headstock of the boring and milling machine illustrated in Figs. 1 and 2.

The power means comprise the following parts: a worm 36 meshing with a worm-wheel 37 as illustrated in Fig. 3, said worm-wheel being loosely carried by the shaft 30. This worm-wheel is automatically coupled to or uncoupled from the shaft 30 by a clutching means of any conventional type such as for instance the clutching means illustrated in Fig. 3 according as to whether the turnstile 31 is disconnected or connected to shaft 30. The clutching of the turnstile is performed through a mere thrust on the arms of the turnstile. This effect allows hand operation without any interference from the power feed means. The latter is obtained through the same parts as the hand control, but from the worm 36 mounted on the shaft 38 driven by an electric motor 39 through the agency of a feed-box 40.

The operation of the above disclosed arrangement for the feed of the spindle is therefore as follows:

(a) Hand operation: the turnstile 31 is actuated so as to rotate the helical gear 29 which drives the helical gear 28. The latter drives the shaft 25 and if the claws 22—23 engage one another by reason of the lever 32 being in the "spindle feed" position, the screw 18 will rotate. As it is prevented from moving translationally, said screw constrains the nut 17 held fast against rotation to move longitudinally and consequently to drive the spindle 12 through the agency of the collar 15. According to the direction of rotation of the turnstile 31, the spindle is caused to project or to retract.

(b) Power feed: the turnstile 31 is set in its position for disengaging the manual control and for connecting the power feed and the motor 39 is operated in the direction of rotation and at the speed desired, the lever 32 being still set in its gears feed position. The motor drives the spindle in the feed box 40 and the shaft 38 which carries worm 36 meshing with the worm-wheel 37, the transmission being thereafter ensured through the same members as before disclosed with reference to hand operation, so that the nut 17 moves together with the spindle.

Most of the parts that have been described for controlling the feed of the spindle and that have been illustrated in Figs. 3 and 4 are also used for controlling the displacement of the headstock 6 on its shoe. The control of the displacement of the headstock 6 on its carriage or shoe 4 is provided by means of a screw 41 rigidly secured to the shoe 4 and engaging a nut 42 adapted to rotate in a support 43 rigid with the body of the headstock. The nut carries a wheel 44 meshing with a gear-wheel 45 adapted to rotate loosely on the sleeve 8 of the machine while being held axially in a given position with reference to said sleeve; said gear-wheel 45 is adapted to mesh with the above-mentioned gear wheel 24. For engaging the wheels 45 and 24 it is sufficient to move the lever 32 into its "headstock feed" position.

The operation of this device controlling the feed of the headstock 6 over its carriage or shoe 4 is very simple; the same turnstile or the same motor is used for the feed of the spindle and of the headstock; however for the feed of the spindle 12, the gearwheel 24 is moved to provide for an engagement between the claws 22—23 while for the feed of the headstock 6 the gear wheel 24 engages the pinion 45 which in its turn drives the nut 42 through the agency of the wheel 44. As the screw 41 is supported upon the carriage against axial and rotational movement thereof and the nut 42 rotates upon the screw, said nut will move over the screw and drive along with it the support 43 and the headstock 6 rigid therewith.

Figure 5:
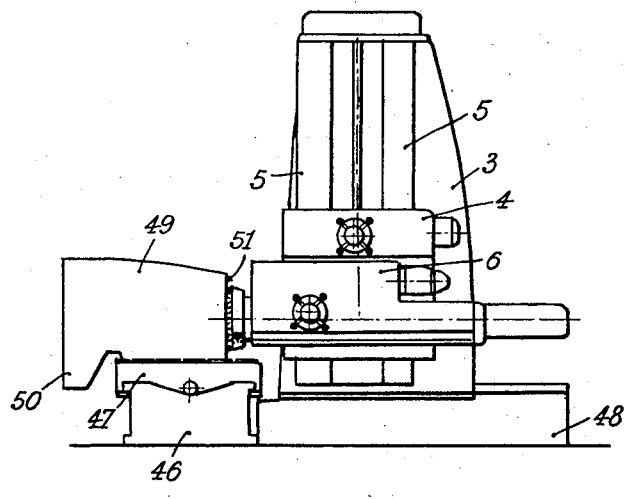
Figs. 5 and 6 are elevational views similar to Fig. 1 showing two examples of the manner of mounting cutters on a boring and milling machine of a type somewhat different from that illustrated in Fig. 1.
Figure 6:
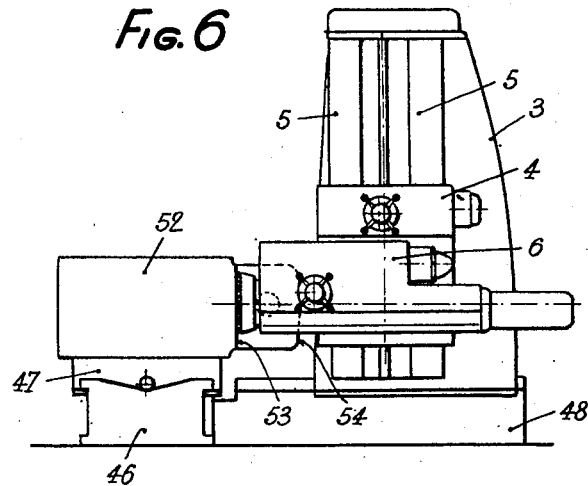

In Figs. 5 and 6 are illustrated two examples of cutting operations for which the machine of the invention is particularly advantageous in which machine a headstock sliding in the same direction as the spindle in accordance with the object of my invention is employed. In both cases, the invention is applied to boring and milling machines of a type somewhat different from that illustrated in Fig. 1. In the present case, instead of a floor plate 1 for carrying the work to be machined, I use a bed 46 on which may slide a workpiece carrying table 47. Moreover, in both cases illustrated, the upright 3 may move over a bed 48 in a direction parallel to the spindle of the machine. On this upright may slide vertically along the slideways 5 a carriage or saddle 4 over which may slide in its turn as described above the spindle carrying headstock 6, said sliding movement being performed as disclosed also in the direction of the spindle axis.

In the example of Fig. 5, the work to be cut 49 shows a projection 50 which it is necessary to locate outside the table 47; consequently the surface to be machined 51 is at a certain distance from the upright 3; in spite of these conditions, with a milling cutter secured to the sleeve 8 the machining may be executed under excellent conditions while head stock 6 may slide leftwards over the slideway on the saddle 4 whereby no vibrations or chattering of the tool take place, by reason of the rigidity of the head stock and of its slideway.

In the example illustrated in Fig. 6, the work to be machined 52 has two stepped planes 53 and 54 and both of which are to be faced. This operation may be executed easily and very accurately without it being necessary to shift the workpiece on the table by reason of the possible displacements of the headstock over the machine. In the position illustrated in the drawing, the plane 53 is being machined. It is thereinafter sufficient to move the headstock 6 towards the right in order to face the plane 54. Of course any other setting arrangement different from those illustrated in Figs. 5 and 6 by way of example may be adopted.

At the beginning of the present specification, Fig. 3 has been given as illustrating a form of slideway for the headstock 6 on its shoe 4. It would not unduly widen the scope of my invention as defined in the accompanying claims if another form of slideway were adopted; thus, for instance, it is possible to form the shoe 4 in the shape of an L drop shaft-hanger over which the headstock may slide through the agency of slideways 55 as illustrated diagrammatically in Fig. 7.

The front surface 60 of the spindle carrying headstock 6 is machined and trued throughout its surface so as to form a very large bearing surface for the attachments to be mounted on the headstock. The front surface of the headstock may be machined or may be provided with a separate plate which provides the machined and trued surface or face upon which may be mounted the tool fittings or the like.

Lastly my invention, although illustrated in its application to boring and milling machines may be also applied to other types of machine tools wherein the same difficulties are to be overcome.

I wish it to be understood that I do not desire to be limited to the details shown and described, for obvious modifications will occur to a person skilled in the art.

What I claim is:

1. In a machine tool in combination, a spindle, a headstock supporting said spindle for rotation and reciprocation on its axis in said headstock, a carriage supporting said headstock for displacement of said headstock parallel to the axis of said spindle, means supporting said carriage for movement transversely of the spindle axis, driving means for the feed of said headstock on said carriage including a screw supported by said carriage against rotational and endwise movement thereof, a rotary nut engaged by said screw and adapted to move axially of said screw together with said headstock, a rotary sleeve surrounding said spindle for common rotation therewith and for axial relative movement therebetween, a first gear supported by said rotary nut, a second gear loose on said rotary sleeve and coaxial therewith, a first shaft for driving both the feed of said headstock relative to said carriage and the axial feed of said spindle relative to said headstock, a third gear adapted to rotate with said first shaft and to slide thereon, a first clutch member secured to said third gear, a feed screw for the axial spindle feed rotatably supported in said headstock, a second clutch member connected to said feed screw, a nut engaged by said feed screw and connected to said spindle to effect the axial spindle feed, means for selectively operating said third gear to alternately couple same with said second gear and said two clutch members with each other, and power means for driving the axial spindle feed and the headstock feed, said power means being operatively connected to said first shaft.

2. The machine tool of claim 1 comprising manually operable means for controlling the axial feed of said spindle relative to said headstock and the feed of said headstock relative to said carriage, a gear device operatively connected to said first shaft, a second shaft operatively connected with said gear device, a fourth gear loosely mounted on said second shaft, a worm in mesh with said fourth gear and operatively connected to said power means, and coupling means operable to couple said second shaft with either said fourth gear or said manually operable means to assure either power or manual feed of said spindle and of said headstock.

3. A machine tool comprising a headstock, a carriage supporting said headstock on a face of said carriage for rectilinear movement of said headstock in a predetermined direction relative to said carriage and parallel to said carriage face, a spindle supported in said headstock for rotational movement thereof on the axis of the spindle and with said axis parallel to said line of movement of said headstock, said headstock providing on an end portion thereof immovable with respect thereto transversely of said rectilinear movement of said headstock an exterior face in a plane transverse to said line of movement of said headstock, said exterior face being of substantial unobstructed area and being machined and trued in said plane with respect to said line of movement of said headstock for attachment of tool fittings or the like to be accurately held on said exterior face of said headstock in operative position immovable with respect to said headstock, a ring supported in said headstock coaxially with said spindle and so as to provide for rotation of said ring and said spindle relative to each other, said ring being operatively connected to said carriage to effect said rectilinear movement of said headstock with respect to said carriage upon rotation of said ring on said spindle axis, and driving means supported in said headstock at the side of said spindle which is opposite to the side thereof disposed toward said face of said carriage, said driving means being operatively connectible to said ring and operable upon such connection to effect said rectilinear movement of said headstock with respect to said carriage.

References Cited in the file of this patent

UNITED STATES PATENTS

| Number | Name | Date |
|---|---|---|
| 1,397,696 | Nelson | Nov. 22, 1921 |
| 1,488,653 | Sundstrand | Apr. 1, 1924 |
| 2,028,727 | Perry et al. | Jan. 21, 1936 |
| 2,040,872 | Oberhoffken | May 19, 1936 |
| 2,227,410 | Johnson | Dec. 31, 1940 |
| 2,263,404 | Armitage et al. | Nov. 18, 1941 |
| 2,325,294 | Woytych | July 27, 1943 |
| 2,344,039 | Hack | Mar. 14, 1944 |
| 2,345,060 | Morton | Mar. 28, 1944 |
| 2,488,324 | Pegard | Nov. 15, 1949 |
| 2,554,207 | Pegard | May 22, 1951 |

FOREIGN PATENTS

| Number | Country | Date |
|---|---|---|
| 2,895 | Great Britain | Feb. 4, 1914 |